Figure 1:
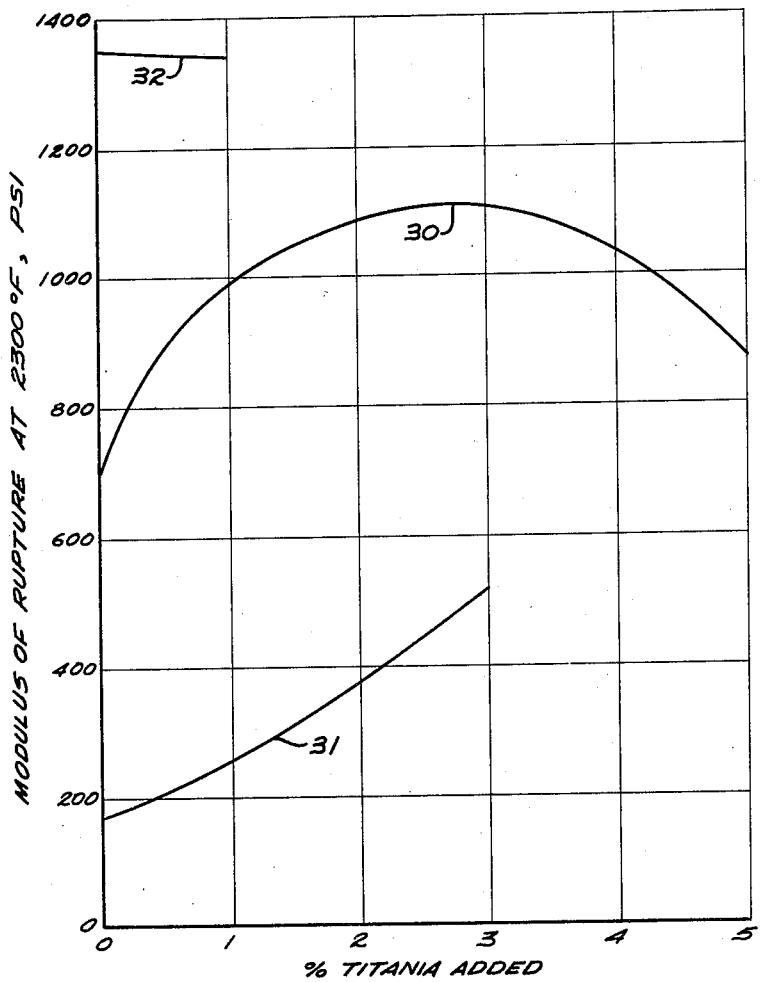

INVENTORS
PETER HARRY HAVRANEK &
BEN DAVIES
ATTORNEY

United States Patent Office 3,194,672
Patented July 13, 1965

3,194,672
FIRED BASIC REFRACTORY SHAPES
Ben Davies and Peter H. Havranek, Pittsburgh, Pa., assignors to Harbison-Walker Refractories Company, Pittsburgh, Pa., a corporation of Pennsylvania
Filed Apr. 4, 1963, Ser. No. 270,699
5 Claims. (Cl. 106—59)

This invention relates to improved, fired, basic refractory shapes. In another aspect, the invention relates to improved, fired, basic refractory structures, basic refractory shapes for fabrication of such structures, and methods of fabrication of the shapes.

Refractories made from a mixture of dead burned magnesia and chrome ore hold an important place in industry. These refractories are generally divided into those which have a predominance of chrome ore and those having a predominance of magnesia. This invention is particularly concerned with those having a predominance of magnesia, and to refractory structures which they are used to fabricate. Both of the foregoing types of refractories are referred to in the art as basic refractories. There are various commercial versions of them, which are nomally sold as chemically bonded unbuned refractories, or as burned refractories. This invention relates particularly to the latter.

Despite the technical advances of contemporary workers, burned basic refractory shapes or brick of the magnesia-chrome ore type are characterized by relatively low strength, somewhere within the temperature range of use. It is not uncommon for their modulus of rupture to be less than 600 p.s.i. at room temperature, less than 200 p.s.i. at 2300° F., and even weaker at higher temperatures. In other cases, the brick may be quite strong at room temperatures (1000–1500 p.s.i.), but no stronger at high temperatures than the figures just cited.

The foregoing is discussed in detail in copending application, Serial No. 259,461, entitled "Refractory Structure and Shapes Therefor," filed February 18, 1963, and owned by the same assignee as the instant invention. In the copending application, means is provided for obtaining excellent fired basic refractory shapes at burning temperatures of 2900 and, preferably, 2950° F. Among other things, that application discloses use of a small amount of titania to lower the firing temperature required for making the shapes of the invention therein disclosed and claimed.

Titania has been suggested as an additive to fired refractory shapes made substantially entirely from dead burned magnesia or magnesite, as a means to increase density and lower the spalling loss of this type of shape. Our work indicated that titania additions to fired magnesia shapes undesirably and drastically reduced the ability of such shapes to resist deformation under load, which is probably one reason titania-containing magnesia shapes have not been commercially successful in many environments. We are also aware that Continental practices, in particular the British, have suggested additions of titania to chrome ore-magnesia shapes and shapes made entirely of chrome ore. Our work indicated small titania additions to chrome ore and chrome ore-magnesia shapes had negligible effect on physical properties, and little or no effect on thermal properties. However, we have now discovered that by carefully controlling the chemical content of the chrome ore and magnesia, which is used to make magnesia-chrome ore shapes, minor amounts of finely divided titania or titania-containing compounds can be added, to increase the hot strength of such shapes without deleteriously affecting other desirable properties of such shapes.

Accordingly, it is an object of this invention to provide improved, fired, basic refractory shapes of the magnesia-chrome ore type. It is another object of the invention to provide improved, fired, magnesia-chrome ore shapes having good strength at elevated temperatures, and which may be fired at relatively low temperatures in manufacture.

Briefly, according to one aspect of the invention, the fired magnesia-chrome ore refractory shapes of this invention are made from a size graded refractory brickmaking batch consisting essentially of about 30 parts of low silica chrome ore and about 70 parts of high purity dead burned magnesia, to which about 0.5 to 5% of −325 mesh technical grade titania is added. Shapes are made from the batch by conventional power pressing or other brickmaking techniques, and are fired at a temperature of at least about 2850° F. The resulting shapes have good hot strength, as measured by modulus of rupture at 2300° F., without loss of the other beneficial properties of 70/30 magnesia-chrome ore shapes.

As is understood by those skilled in the art, to improve strength of chrome ore-magnesia shapes, one need merely increase the quantity of chrome ore. Thus, the strongest (at room temperautre) brick of this type, which can be made from the group of basic materials chrome ore and magnesia, is theoretically a fired 99+% chrome ore. Perhaps one of the most distressing properties of very high chrome ore content refractories is low refractoriness. One the other end of the range of possible mixtures is the fired 100% magnesite shape, which has excellent resistance to basic open hearth slags and the like, but which is characterized by poor resistance to sudden variations in temperature which cause extensive spalling of such shapes. The magnesia-chrome ore shape had come to be recognized by some in the art as a balance of the desirable properties of each having particular utility in building the open hearth. Our work has shown a mixture of about 70 parts dead burned magnesia and about 30 parts low silica chrome ore to be an optimum mixture for most purposes, with a very good range being 60 to 80% magnesia—40 to 20 parts chrome ore. It is with this range that our invention is particularly concerned.

Figure 2:

A better understanding and other features and advantages of this invention will become apparent to those skilled in the art from a study of the following detailed description, with reference to the accompanying drawings. In these drawings:

FIG. 1 is a comparative plot of modulus of rupture at 2300 vs. percent titania added to fired 70/30 magnesia-chrome ore brick of the invention; and FIG. 2 is a photomicrograph, at 875× magnification, of a portion of a brick according to the invention.

It should be understood the following examples are but illustrative of the best mode now known to us for the practice of our invention, but we do not wish to be limited thereto but, rather, wish it understood that the true measure of the spirit and scope of the invention is as defined in the hereafter appended claims. Also, unless otherwise stated, all chemical analyses given herein are on the basis of an oxide analysis, in conformity with the conventional practices of reporting the chemical analysis of refractory materials. All parts and percentages are by weight, and all size grading is according to the standard Tyler series. Also, all chemical analyses and size grading should be considered but typical.

Example I

A batch was prepared which consisted of 30 parts Philippine chrome ore concentrates and 70 parts dead burned magnesia. −6+28 mesh chrome ore constituted about 5% of the batch, and the rest of the chrome ore was −28 mesh. Of the magnesia, a −4+10 mesh fraction constituted 30% of the batch; −10+28 mesh magnesia constituted another 10% of the total batch, with the remaining magnesia being ball mill fines, i.e. −150 mesh, and equaling about 30% of the total batch. Of the ball mill fine magnesia, a major portion, i.e. over 50%, passed a 325 mesh screen. We divided this batch into four equal portions. To a first, we added 1 part of −325 mesh technical grade titania; to a second, we added 3 parts of titania; and to a third, we added 5 parts of titania. We used the last portion as a standard.

We tempered each of the batches with about 5 parts of a 50/50 lignin liquor and water mixture, and pressed the batches into shapes on a power press at about 8000 p.s.i. All of the shapes were then fired at cone 30 (about 2890° F., which temperature was held for 10 hours). After cooling, the shapes were subjected to physical testing. The standard had a bulk density of about 185 p.c.f. the 1 and 3 parts titania-containing shapes had densities of 185 and 183, respectively, while the 5 part titania-containing shape had a density of only 177 p.c.f. The modulus of rupture at 2300° F. of these four respective types of shapes was 680, 990, 1110 and 880, respectively. Thus, the 3% titania addition gave a modulus of rupture at 2300, which was 63% better than that of the standard—which was only 680 p.s.i. The 5 part titania addition gave a 29% increase in strength at 2300° F., and the 1 part titania addition gave a 46% increase in strength at 2300° F. Porosity, specific gravity, and subsidence under load above 3000° F. for all four types of shape were about the same, thus, indicating that the titania addition increased modulus of rupture at 2300 without adversely affecting other of the desirable properties of fired magnesia-chrome ore shapes.

*Example II*

We prepared another batch consisting of about 90 parts of dead burned magnesia and about 10 parts of the Philippine chrome ore concentrates. The overall size grading was about the same as that discussed under Example I, with −6+28 mesh chrome ore constituting about 2 parts of the total batch, the rest of the chrome ore being −28 mesh. We divided this batch into two portions, to one of which was added 1 part of −325 mesh technical grade titania. We tempered the two portions, manufactured shapes therefrom, and fired them in the same manner as described under Example I, above. The densities of the shapes resulting from both portions were in good agreement, as were the porosity and specific gravity. However, there was a 50% increase in modulus of rupture at 2300° F., i.e. from 420 p.s.i. for the standard to 630 p.s.i. for the brick containing the titania. However, this 630 p.s.i. value for hot modulus of rupture is still lower than that which we desire for best results in an open hearth furnace, for which installation we suggest as minimum of about 900 p.s.i. and, preferably, 1000 p.s.i. at 2300° F.

*Example III*

We prepared a batch of about 80 parts of dead burned magnesia and about 20 parts of Philippine chrome ore concentrates. −6+28 mesh chrome ore constituted about 4 parts of the total batch, with the remainder of the chrome ore passing a 28 mesh screen. The overall sizing of the batch was about the same as the batches of the Examples I and II. We divided the batch into two equal portions, adding 1 part of titania to one of the portions. Fired shapes were made from both portions in the same way as shapes were made from the portions discussed under Examples I and II. The overall physical properties for which we tested were about the same for shapes made from both of the portions. However, there was a 68% increase of modulus of rupture at 2300 by the addition of 1 part technical grade titania, i.e. to about 900 p.s.i.

*Example IV*

We prepared another batch of about 60 parts dead burned magnesia and about 40 parts Philippine chrome ore concentrates. −6+28 mesh chrome ore constituted about 8 parts of the total batch, with the remaining chrome ore being −28 mesh and constituting 32 parts of the total batch. Of course, the magnesia was so size graded as to give an overall sizing substantially the same as that given under Examples I, II and III, above. The batch was divided into two portions, to a first of which we added 1 part of −325 mesh technical grade titania. The portions were manufactured into shapes, and fired using substantially the same techniques as discussed under Examples I through III, above. The resulting shapes showed remarkable similarity of physical properties for which we tested, with the exception that modulus of rupture at 2300 increased 23% to 950 p.s.i. by the addition of 1 part of technical grade titania.

The dead burned magnesia used in the above tests was that manufactured according to the techniques of United States Patent No. 3,060,000, and analyzing about 98% MgO, the remaining 2% being $SiO_2$, $Fe_2O_3$, $Al_2O_3$, ignition loss and trace impurities. The Philippine chrome ore concentrates used had a chemical analysis substantially as follows:

| | Percent |
|---|---|
| $SiO_2$ | 2.3 |
| $Al_2O_3$ | 30 |
| FeO | 12.6 |
| $Cr_2O_3$ | 33 |
| CaO | 0.6 |
| MgO | 19.0 |
| Ignition loss (by difference) | 2.5 |

Of course, other dead burned magnesias (or magnesites) and chrome ores may be used. The essential requirement is a chemical one; namely, that the total $SiO_2$ content of the ingredients selected be less than 5%, and, preferably, less than 2%. With greater amounts of silica present, after firing, the groundmass or matrix is characteristically forsteritic, and does not have the excellent chrome ore and magnesia particle bonded relationship we obtain according to this invention.

Noting FIG. 2, for the moment, the dark gray areas 10 are periclase, the darker gray areas 11 are forsterite, the larger and lighter gray areas 12 are chrome ore, the next lightest gray areas 14 are magnesium titanate spinel ($2MgO \cdot TiO_2$), with the lightest—almost white—areas 15 being calcium-titanate. It appears the magnesium titanate spinel partially envelops and attaches to the periclase particles in an adhesive relationship. By contrast, the magnesium titanate spinel appears to be attached to the chrome ore by penetration or adsorption or solid solution, the apparent result of exchange diffusion of oxides, such as $Fe_2O_3$ and $TiO_2$ between the chrome ore and the fine material in the batch. Note the magnesium titanate appears to completely envelop the chrome ore, leaving little or no void area between them; whereas, it only partially surrounds periclase particles. It should be noted that the periclase particles shown in the photomicrographs are actually crystallites, which may be directly bonded to each other in rather coarse agglomerates of periclase. For example, the areas 20 and 21 are probably the result of −4+10 mesh magnesia additions to the brickmaking batch, which relatively coarse material, under the microscope, shows up as a plurality of crystallites bonded together.

In FIG. 1, we have plotted modulus of rupture at 2300 vs. titania addition for our preferred 70/30 magnesia-chrome ore fired shapes (line 30), in comparison to 100% dead burned magnesia fired shapes (of 98% MgO content, line 31), and shapes consisting of 80% Philippine chrome ore/20% magnesia of 95% MgO content (line 32). The 100% chrome ore shape, as indicated by line 30, is but slightly affected by titania addition, with the only noticeable effect being a decrease in modulus of rupture at 2300 with increasing amounts of titania. As indicated by line 31, the fired 100% magnesia shape is benefitted, as far as strength goes, by the addition of titania. However, among other things, this strength increase is at the sacrifice of ability to resist subsidence above 3000° F. Note, also, that titania additions to fired 80% Philippine chrome ore/20% magnesia of 95% MgO content and 100% magnesia shapes appear to have a predictable effect on modulus of rupture at 2300, i.e. a relatively stright line plot results. Quite surprisingly, with the magnesia-chrome ore mixture, a somewhat parabolic curve results. This curve indicates that, to have a modulus of rupture at 2300 above about 900 p.s.i., the titania addition must be maintained between about 0.5 and 5%, by weight, addition, based on the total weight of the dry solids in the batch. All of the data plotted in FIG. 1 is based on shapes burned at cone 30, i.e. about 2890° F. for 10 hours, in order to obtain good data comparison.

While we discuss technical grade titania above, it can also be added in the form of other compounds, e.g. as one of the following spinels:

Magnesium titanates _____ ($MgO \cdot TiO_2$, $2MgO \cdot TiO_2$, $MgO \cdot 2TiO_2$).
Cobalt titanate _____ ($2CoO \cdot TiO_2$).
Manganese titanate _____ ($2MnO \cdot TiO_2$).
Zinc titanate _____ ($2ZnO \cdot TiO_2$).
Iron titanate _____ ($2FeO \cdot TiO_2$).

etc. or in the form of any inorganic or organic salt of titanium that will decompose to yield $TiO_2$, such as $TiCl_4$, $TiI_4$, $TiS_2$, $Ti_2(C_2O_4)_3 \cdot 10H_2O$.

In one specific experiment, we used ilmenite ($FeO \cdot TiO_2$) in additions of 1%, 2% and 4% to the mix described in Example I. The ilmenite was ground to 90% −325 mesh. These brick were burned to cone 30 (2890° F., 10-hour hold).

Hot load strength was again improved without affecting other physical properties adversely in additions of up to 2% ilmenite, viz.:

| Additive | Bulk Density (p.c.f.) | Apparent Porosity, percent | Hot Strength at 2300° F. (p.s.i.) |
|---|---|---|---|
| 0% (Standard) | 184 | 20.4 | 940 |
| 1% ilmenite | 185 | 19.9 | 1160 |
| 2% ilmenite | 185 | 20.1 | 1330 |
| 4% ilmenite | 182 | 21.4 | 1410 |

Having thus described the invention in detail and with sufficient particularity as to enable those skilled in the art to practice it, what we desire to have protected by Letters Patent is as set forth in the following claims.

We claim:

1. In fired, basic refractory shapes made from refractory brickmaking size graded batches, said batches consisting essentially of magnesia and chrome ore, said magnesia constituting from 80 to 60 parts, by weight, of the batch, the improvement consisting of, the total $SiO_2$ content of the batch being less than about 5%, by weight, based on the weight of the total batch, and from 0.5 to 5 parts, by weight, of titania in the brickmaking batch to increase modulus of rupture at 2300° F. in said fired shapes without deleteriously affecting other physical properties, and said shapes fired at a temperature on the order of at least about 2890° F.

2. Fired refractory shapes according to claim 1 made from batches consisting of about 70 parts, by weight, of dead burned magnesia and about 30 parts, by weight, of chrome ore.

3. Fired refractory shapes according to claim 1 in which the $SiO_2$ content is less than about 2% by weight.

4. Fired shapes according to claim 1 in which the titania is in the form of finely divided ilmenite.

5. A fired basic refractory shape consisting essentially of chrome ore and magnesia, said shape having a modulus of rupture at 2300° F. of at least about 900 p.s.i., said shape made from a batch consisting of 80–60 parts, by weight, of magnesia the remainder being chrome ore and a sufficient quantity of material of the group consisting of inorganic and organic salts of titanium to yield from about 0.5 to 5 parts, by weight, of $TiO_2$ upon firing of the shape, and there being no more than about 5%, by weight of $SiO_2$ in the total batch, said shape being mineralogically characterized by relatively coarse chrome ore and periclase crystallite agglomerates bonded together by magnesium titanate spinel, and any forsterite and calcium titanate appearing as discontinuous pockets distributed throughout the magnesium titanate spinel.

References Cited by the Examiner

UNITED STATES PATENTS 3,093,495   6/63   Von Mickwitz _____ 106—58

FOREIGN PATENTS 468,765   7/37   Great Britain.

TOBIAS E. LEVOW, *Primary Examiner.*